United States Patent
Stephan et al.

(10) Patent No.: US 11,355,144 B1
(45) Date of Patent: Jun. 7, 2022

(54) MOUNTING SUPPORTS THAT CREATE A BOND PAD GAP FOR A HARD DISK SLIDER

(71) Applicant: Seagate Technology LLC, Fremont, CA (US)

(72) Inventors: Joseph M. Stephan, Eden Prairie, MN (US); Robert Aaron Newman, Discovery Bay, CA (US); Lars H. Ahlen, Bloomington, MN (US); Aaron Michael Collins, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/317,277

(22) Filed: May 11, 2021

(51) Int. Cl.
*G11B 5/60* (2006.01)
*G11B 5/127* (2006.01)
*G11B 5/31* (2006.01)

(52) U.S. Cl.
CPC .......... *G11B 5/6082* (2013.01); *G11B 5/3163* (2013.01); *G11B 5/1278* (2013.01)

(58) Field of Classification Search
CPC .... G11B 5/6082; G11B 5/3163; G11B 5/1278
See application file for complete search history.

(56) References Cited

U.S. PATENT DOCUMENTS

| | | | | |
|---|---|---|---|---|
| 4,761,699 A | * | 8/1988 | Ainslie | G11B 5/3106 29/603.01 |
| 4,789,914 A | * | 12/1988 | Ainslie | G11B 5/3103 360/234.4 |
| 5,384,432 A | * | 1/1995 | Noro | G11B 5/4853 174/117 F |
| 5,610,783 A | * | 3/1997 | Maffitt | G11B 5/3106 360/234.5 |
| 5,808,834 A | * | 9/1998 | Jurgenson | G11B 5/4853 360/234.5 |
| 6,246,548 B1 | | 6/2001 | Williams | |
| 6,351,353 B1 | * | 2/2002 | Sluzewski | G11B 5/5552 360/234.5 |
| 6,985,332 B1 | * | 1/2006 | Sluzewski | G11B 5/3103 360/234.5 |
| 7,777,991 B2 | | 8/2010 | Feng et al. | |
| 7,929,248 B2 | * | 4/2011 | Zhu | G11B 5/4853 360/234.5 |
| 8,054,584 B2 | * | 11/2011 | Limmer | G11B 5/4826 360/234.5 |
| 8,254,212 B2 | * | 8/2012 | Snyder | G11B 5/102 369/13.33 |
| 8,400,736 B2 | * | 3/2013 | Greminger | G11B 5/4853 360/234.5 |
| 8,411,535 B1 | * | 4/2013 | Hirano | G11B 5/105 369/13.32 |

(Continued)

*Primary Examiner* — Brian E Miller (74) *Attorney, Agent, or Firm* — Mueting Raasch Group (57) ABSTRACT

A slider includes a slider body with an air-bearing surface and a top surface opposing the air-bearing surface. A plurality of slider bond pads are disposed on or parallel to the top surface and proximate to or at a trailing edge of the slider. The plurality of slider bond pads have an exposed surface facing away from the top surface of the slider body. One or more mounting supports extend from the top surface to a distance of at least 12 μm above the exposed surface of the plurality of slider bond pads.

20 Claims, 8 Drawing Sheets

(56) References Cited

U.S. PATENT DOCUMENTS

| | | | | |
|---|---|---|---|---|
| 8,705,324 | B2* | 4/2014 | Shivarama | G11B 5/4826 369/13.32 |
| 8,902,547 | B1* | 12/2014 | Zhong | G11B 5/4853 360/234.5 |
| 8,995,091 | B2* | 3/2015 | Inoue | G11B 5/102 360/236.5 |
| 9,171,562 | B1* | 10/2015 | Puttichaem | G11B 5/105 |
| 10,600,436 | B1* | 3/2020 | Davidson | G11B 5/4826 |
| 10,643,645 | B2* | 5/2020 | Davidson | G11B 5/4826 |
| 2006/0082917 | A1* | 4/2006 | Yao | G11B 5/4853 360/75 |
| 2007/0274005 | A1* | 11/2007 | Zhu | G11B 5/102 360/234.4 |
| 2008/0056073 | A1* | 3/2008 | Shimizu | G11B 7/124 369/13.02 |
| 2009/0195930 | A1* | 8/2009 | Lille | G11B 5/102 360/234.5 |
| 2013/0133182 | A1* | 5/2013 | Bonhote | G11B 5/4853 29/603.03 |
| 2013/0286803 | A1* | 10/2013 | Shivarama | G11B 5/4826 369/13.32 |
| 2017/0287514 | A1* | 10/2017 | Rausch | G11B 5/02 |
| 2021/0013695 | A1* | 1/2021 | Honda | H01S 5/0216 |

* cited by examiner

MOUNTING SUPPORTS THAT CREATE A BOND PAD GAP FOR A HARD DISK SLIDER

SUMMARY

The present disclosure is directed to mounting supports that extend a bond pad gap for a hard disk recording head. In one embodiment, a slider includes a slider body with an air-bearing surface and a top surface opposing the air-bearing surface. A plurality of slider bond pads are disposed on or parallel to the top surface and proximate to or at a trailing edge of the slider. The plurality of slider bond pads have an exposed surface facing away from the top surface of the slider body. One or more mounting supports extend from the top surface to a distance of at least 12 µm above the exposed surface of the plurality of slider bond pads.

In another embodiment, a trace-gimbal assembly includes a suspension surface and to a plurality of trace bond pads. The trace bond pads are electrically coupled to traces of a flex circuit that deliver signals to and from signal processing circuitry of the apparatus. A slider is coupled to the trace-gimbal assembly and includes a slider body with an air-bearing surface, and a top surface opposing the air-bearing surface. A plurality of slider bond pads are disposed on or parallel to the top surface and proximate to or at a trailing edge of the slider. The plurality of slider bond pads have an exposed surface facing away from the top surface of the slider body. One or more mounting supports extend from the top surface to a distance of at least 12 µm above an exposed surface of the plurality of slider bond pads. The one or more mounting supports are attached to the suspension surface of the trace-gimbal assembly such that slider bond pads and the trace bond pads are parallel to one another and separated by gaps of the distance of at least 12 µm, the gaps being filled with solder that electrically couples the transducer bond pads to the slider bond pads.

In another embodiment, a method, involves depositing an adhesion layer on at least a portion of a top surface of a slider body having a top surface opposite an air-bearing surface. A first photolithography cycle is performed to deposit a first metal layer having a thickness of at least 8 µm. A second photolithography cycle is performed to deposit a second metal layer having a thickness of at least 8 µm over the first metal layer. The first and second layer form a mounting support on the top surface.

In another providing a slider having a slider body formed of a first material. The slider body has an etching surface opposite an air-bearing surface. The slider includes a transducer portion comprising a second material formed at a trailing edge of the slider. The second material has a higher etch rate than the first material. The method involves removing a portion of the etching surface and the transducer portion to form a mounting support above a top surface. In another embodiment, a method involves plurality of bond pads are deposited on the top surface. A top of the mounting support is at least 12 µm above an exposed surface of the plurality of bond pads. In some embodiments, the method may further involve attaching the mounting support of the slider to a suspension surface of a gimbal such that the bond pads are aligned with corresponding pads on the suspension surface. The bond pads are separated from the corresponding pads by a gap defined by the mounting support. The method may further involve introducing individual solder beads in the gap between each of the bond pads and corresponding bond pads, and reflowing the solder beads to create interconnects between the bond pads and corresponding bond pads.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices such as hard disk drives (HDDs). An HDD generally uses one or more recording heads (also referred to as heads, read heads, write heads, read/write heads, etc.) held over respective one or more surfaces of a disk by an actuator-driven arm Recording heads progressively add more recording head features as technology advances. Electrical interconnects are provided to connect those features from slider bond pads to trace gimbal assembly (TGA) or suspension trace bond pads to connect with data storage device circuitry. As recording head features are added, the number of interconnects used to support those features increases as well.

To form an interconnect, a slider (which includes the read/write head at one end) is placed on a suspension with suspension trace bond pads such that the head bond pads are aligned with and perpendicular to the suspension trace bond pads. A mechanical system may be used to jet solder spheres to connect the slider bond pads to the suspension trace bond pads in a thermal interconnect (TIC) process. The present disclosure generally describes a recording head design with parallel or opposing bond pad interconnects, and describes slider features that allow increasing the density of the interconnects.

Figure 1:
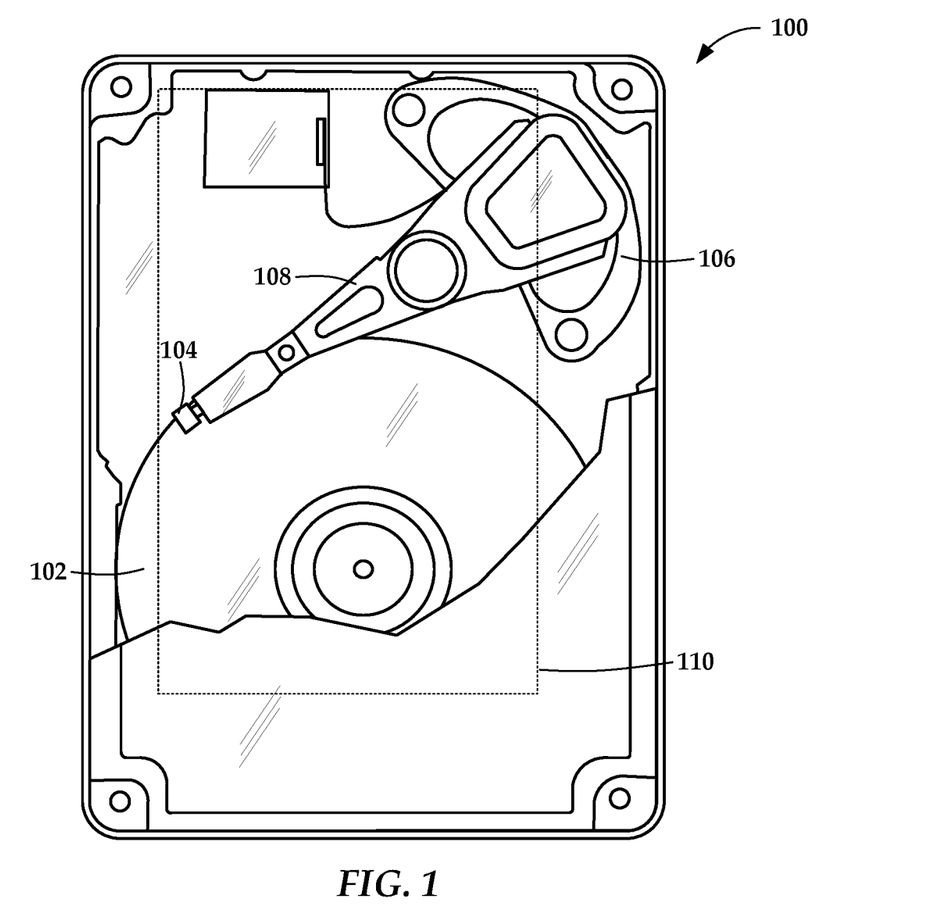
FIG. 1 is a top view of a hard disk data storage device according to an example embodiment.

FIG. 1 shows an illustrative hard disk data storage apparatus 100 in which certain slider interconnect embodiments disclosed herein may be incorporated. The data storage apparatus 100 includes a data storage disk 102 and a slider 104. The slider 104 includes transducer elements (not shown in FIG. 1) such as a reader (e.g., magnetoresistive stack) and writer (e.g., magnetic write coil and poles) The slider 104 is positioned above the disk 102 to read data from and/or write data to the disk 102, which is rotated by a spindle motor (not shown). An actuator 106 rotates an arm 108 upon which the slider 104 is mounted. The rotation induced by the actuator 106 positions the slider 104 relative to data tracks on the rotating disk 102. Both the spindle motor and actuator 106 are connected to and operated through drive circuitry 110, e.g., a circuit card.

Figure 2:
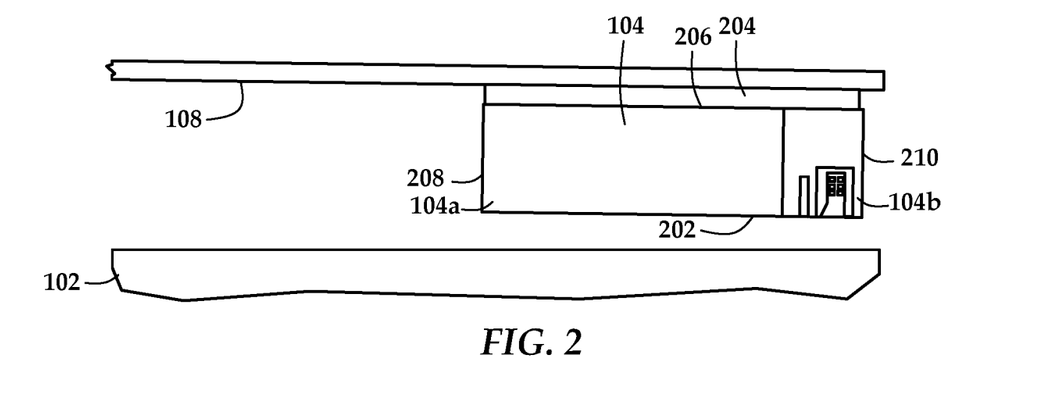
FIG. 2 is a is a side view of a recording head according to an example embodiment.

In FIG. 2 is a side view of the slider 104 above the medium 102 shows additional details of the data storage apparatus 100. Transducer elements within the head portion of the slider 104 include read and write elements encapsulated in an insulating structure to form a transducer portion 104b of the slider 104. As shown, the slider 104 includes a media-facing surface 202, e.g., configured as an air bearing surface (ABS). The slider 104 is coupled to the arm 108 through a gimbal 204 coupled to a top surface 206 of the slider 104 facing away from the disk 102. Note that the term "top surface" is used for convenience of description, and does not require any particular orientation of the slider with respect to a reference point, e.g., the ground. The disk 102 can be a continuous storage medium, a discrete track medium, a bit patterned medium or other magnetic storage medium including one or more magnetic recording layers.

During operation, rotation of the disk 102 creates an air or gas flow along the media-facing surface 202 of the slider 104 from a leading edge 208 to a trailing edge 210 of the slider 104. The air or gas flow along the media-facing surface 202 creates a pressure cushion to support the slider 104 above the disk 102 for read and/or write operations. As shown, the transducer portion 104b is formed at or near the trailing edge 210 of the slider 104. The transducer portion 104b may include elements such as read and write transducers, writer and/or reader heaters, a thermal asperity sensor, heat-assisted recording optics, etc., which are not shown in the interest of simplification. The transducer portion 104b is joined with a slider body 104a. The slider body 104a may be formed of a metal, e.g., AlTiC, and provides a structural attachment for the slider 104 as well as including air bearing features.

Figure 3:
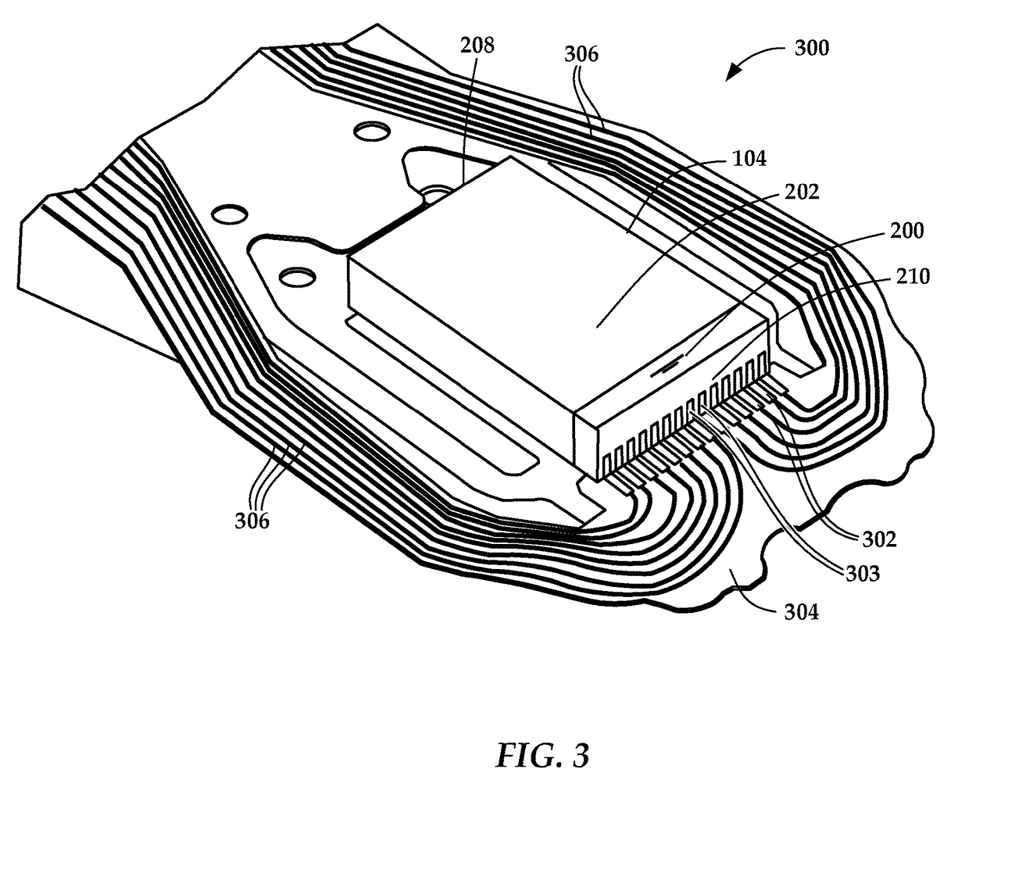
FIG. 3 is a perspective view of a trace gimbal assembly according to an example embodiment.

In FIG. 3, a perspective view shows a trace gimbal assembly (TGA) 300 according to an example embodiment. The TGA 300 provides an electrical interface to electrical elements of the transducer portion 104b of the slider 104, which is shown with its media-facing surface 202 facing upwards. The TGA 300 includes a plurality of trace bond pads 302 on a suspension surface 304 coupled to the traces 306 of a flex circuit extending along opposed sides of the slider 104. The slider 104 is also attached (e.g., bonded) to the suspension surface 304, and this provides a mechanical coupling between the slider 104 and a gimbal suspension (not shown).

During the manufacture of the drive, the trace bond pads 302 are electrically coupled to bond pads 303 of the slider's transducer portion 104b. This electrically connects the transducer portion 104b of the slider 104 to the traces 306. The traces 306 deliver signals to and from the trace bond pads 302 to and from signal processing circuitry of the drive after the drive is fully assembled, coupling the transducer portion 104b to this circuitry. Note that different routings of the traces 306 as well as other physical configuration (e.g., shape, location) of the traces 306 and the rest of the flex circuit may be possible in the embodiments described herein.

Figure 4:
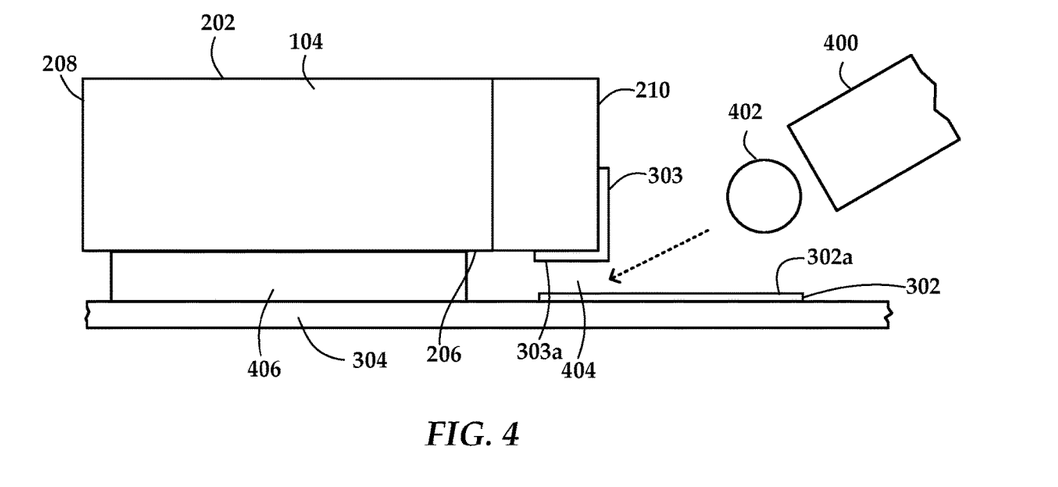
FIGS. 4 and 5 are side views of a slider showing interconnecting of bonding pads according to an example embodiment.
Figure 5:
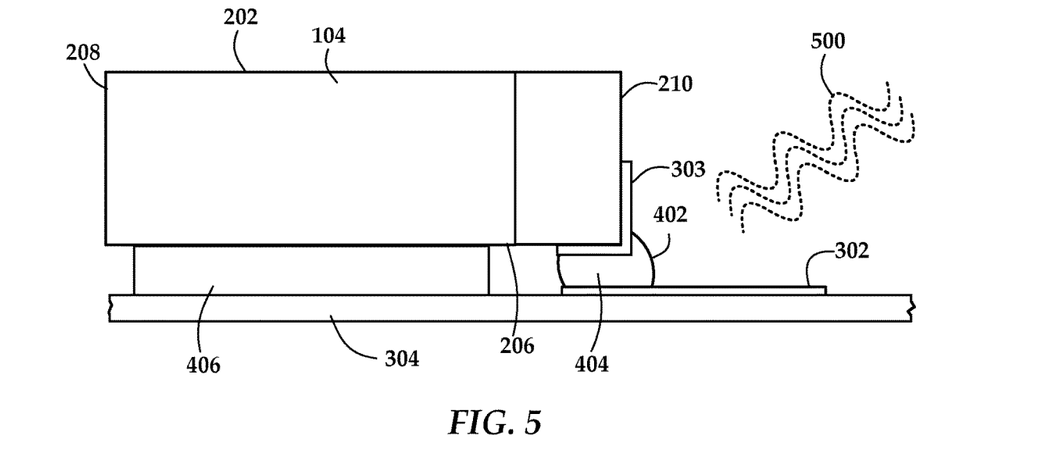

A factory system or device is used to deposit conductive material, such as solder balls (also referred to as spheres, pellets, droplets, beads) to form the connection between slider bond pads 303 and trace bond pads 302. The operation of an assembly system and device according to an example embodiment is shown in FIGS. 4 and 5. As seen in FIG. 4, the system uses one or more capillary tubes 400 that send solder spheres 402 to be deposited in a gaps 404 between the bond pads 302, 303 to form interconnects. As seen in FIG. 5, heat 500 is applied to the solder sphere 402, causing it to melt and reflow. The reflowing results in both bond pads 302, 303 being wetted (e.g., the solder is molten and will adhere to the bond pads) which forms an electrical interconnect, and provides additional mechanical bonding as well.

As new recording technologies are implemented, there may be a need to increase the number of bond pads 303 on the slider 104. For example, technologies such as heat-assisted magnetic recording (HAMR) involve integrating a laser (not shown) with the slider 104, which require at least electrical lines for current supply and current return. A HAMR recording head may include additional optical sensors to control the laser, e.g., a bolometer, which may involve adding additional signal lines to the head. In other cases, multiple transducers, e.g., readers, may be incorporated into the head, each requiring additional signal lines.

Existing production TGA configurations have typically used 10 or fewer bond pads at the recording head. Newer designs are expected to increase this to 12, 14, or higher. For example, the implementation shown in FIG. 3 shows 14 trace bond pads 302 and corresponding slider bond pads 303 (also referred to as recording head bond pads). As the density of bond pads on an interconnect increases, the cost and risk of defects during the interconnect process increases. Bond pads may be reduced in size (for example, pads may be 30 μm wide) and the spaces between the pads may be reduced (for example, spaces may be 23.75 μm wide) to create high density pads (for example, recording heads with 11 bond pads or greater).

To connect high density interconnects, smaller solder spheres (for example, approximately 40 μm wide) may be used, but there may be issues with using smaller solder spheres. Smaller solder spheres pose various operational challenges and the process cost per head increases as solder sphere diameter decreases. Challenges for the mechanical system that deposits the solder spheres may include blocked chutes or capillaries; sheared off solder spheres, debris, or smears; or doubling of solder spheres. Capillaries may also need to be replaced with increased frequency and cost. Reducing the amount of solder and/or the space between bond pads also increases the risk of soldering defects. Interconnects with bond pads that are too close together or that use too little solder risk poor connections, cracks, or missed interconnects. Bond pads that are too close together also risk bridging, such that a bond is formed between adjacent bond pads.

In reference again to FIGS. 4 and 5, the reflowed solder ball 402 has been formed in the gap 404 between opposing bond pairs of slider bond pads 303 and trace bond pads 302. Forming the interconnect between opposing bond pairs, rather than perpendicular bond pairs, may allow a strong joint to be formed without an outward bulge toward adjacent bond pads. By reducing outward bulges, the risk of bridging between adjacent bond pads is decreased. Thus, utilizing opposing bond pads may allow for an increased interconnect density and reduces the limitations of using smaller solder spheres or the risk of defective joints. Thus the slider bond pads 303 and trace bond pads 302 have at least some parts that are parallel to one another separated by the gap 404 between the pair of pads 302, 303. Note while the slider bond pad 304 is shown with parts that are both parallel and perpendicular to the trace bond pad 302, the perpendicular parts are optional.

In order to increase the density of bond pads on the TGA, it is expected that size of the gap 404 will be on the order of 11 µm or more. A gap may be formed in some designs by forming a notch in the slider 104 at the intersection of the trailing edge 210 and the top surface 206 of the slider 104. Such an approach could be problematic for a gap 404 larger than 11 µm, however. As such, embodiments described herein include a mounting support 406 can be formed between the top surface 206 and the suspension surface 304. The mounting support 406 acts both as a structural support and a spacer that creates gaps between an exposed surface 303a of slider bond pads 303 and a corresponding (e.g., parallel) surface 302a of the trace bond pads 302.

In some embodiments, the mounting support 406 formed integrally with the slider 104, e.g., via deposition of materials on the top surface 206 or by removal of materials from the top surface 206. The mounting support 406 includes sufficient adhesion area to support the slider 104, and also has can firmly support the slider 104 in response to external forces, e.g., air-bearing forces, head-to-disk impacts. Thus the mounting support 406 may be at least partly located around the periphery of the top surface 206, as this provides a good resistance against torques applied to the slider 104.

Figure 6:
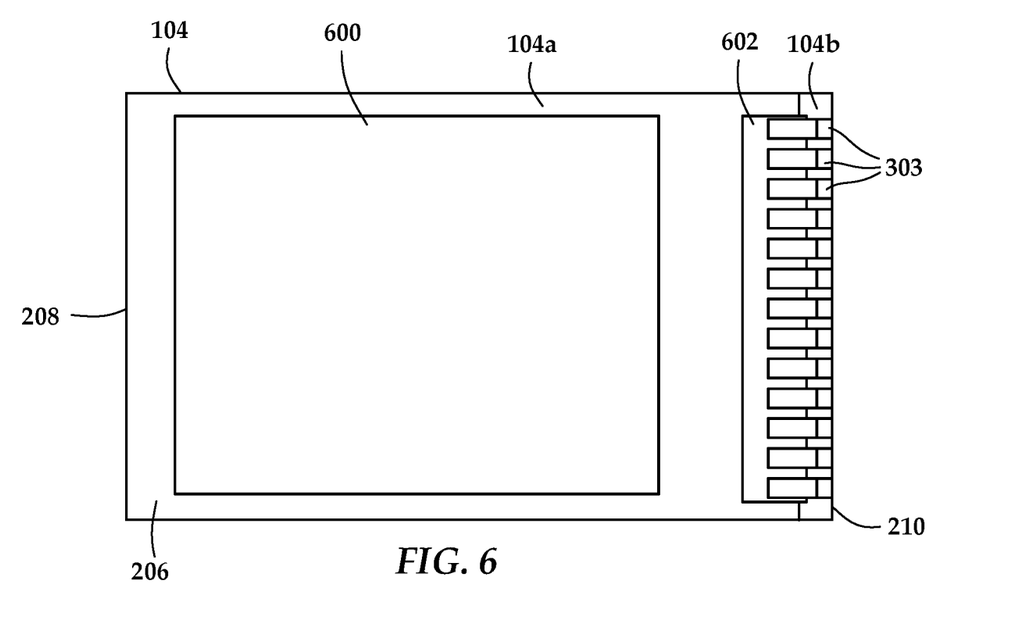
FIGS. 6 and 7 are respective top and side views of a recording head showing a mounting support arrangement according to an example embodiment.
Figure 7:
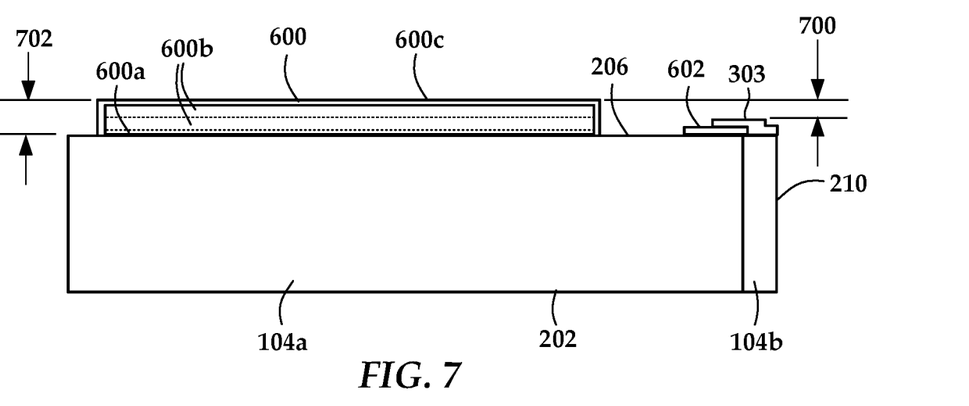

In FIGS. 6 and 7, top and side views of a slider 104 show a slider standoff arrangement according to an example embodiment. As indicated in this view, the head is formed of a metallic slider body 104a and a transducer portion 104b. The metallic slider body 104a is formed, e.g., from AlTiC or the like. When the slider 104 is formed, the AlTiC slider body 104a serves as a substrate on which the transducer portion 104b is formed. The transducer portion 104b includes electrical, magnetic, and in some cases optical components. The transducer portion 104b may be filled mostly with an oxide such as $Al_2O_3$, but may include a wide variety of other oxides, metals, and other materials that are used to form the transducers, sensors, and other components of the transducer portion 104b.

In this embodiment, a mounting support 600 formed as single contiguous structure that covers a majority of the top surface 206. As seen in FIG. 7, single contiguous structure of the mounting support 600 includes an adhesion layer 600a on the metal (e.g., AlTiC) of the slider body 104a. Layers 600b are formed of a second metal that is formed on the adhesion layer. The second metal is different than the first metal (e.g., second metal may include Sn, for example. The adhesion layer 600a may also include metals, such as Ti and Ni. Also shown is a protective top layer 600c, which may be an oxide such as $Al_2O_3$, which passivates the mounting support 600, protecting it from corrosion.

In some embodiments, a height 700 of the mounting support 600 above the slider bond pads 303 may be between 16 µm and 24 µm, although may be below or above this range in some embodiments, e.g., by adjusting process, material, patterns, etc. In one embodiment, the mounting support is added after depositing the slider bond pads 303. Note that in this view the bond pads 303 are shown formed over an insulator layer 602 on the slider body 104a, which keeps the bond pads 303 from shorting to the metal body 104a. Note that a dimension 702 of the mounting support 600 above the top surface 206 may be larger than the height 700 of the mounting support 600 above the slider bond pads 303, due to the thickness of the bond pads 303 and insulator layer 602.

After formation of the bond pads 303, the adhesion layer 600a is deposited, 800 Å Ti+3,000 Å Ni in one example. The adhesion layer 600a is followed by one or more metal layers, e.g., a plurality of 80,000 Å Sn layers. For a 16 µm dimension 700, this may involve depositing two such layers 600b, which involves two cycles of photolithography, deposition, and stripping of photoresist. For a 24 µm dimension 700, this may involve depositing three such layers 600b, which involves three cycles of photolithography, deposition, and stripping of photoresist. After building up of the metal layers 600b, the protective top layer 600c is added, e.g., by depositing 3,000 Å $Al_2O_3$. It will be understood that different shapes and materials may be used to create a similar mounting support and spacer structure.

Figure 8:
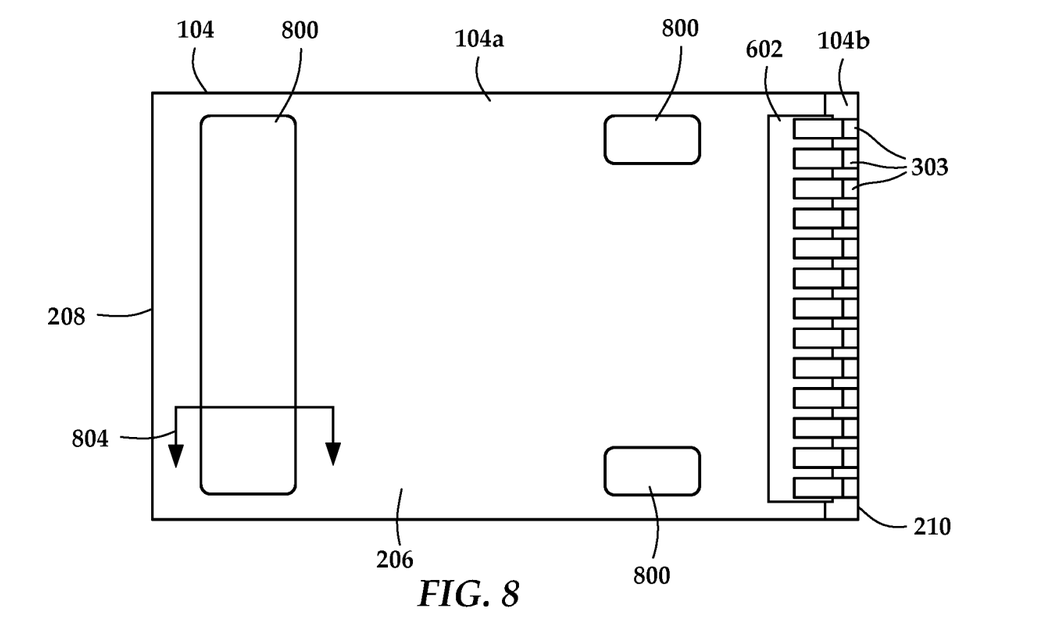
FIGS. 8 and 9 are respective top and side views of a recording head showing a mounting support arrangement according to another example embodiment.
Figure 9:
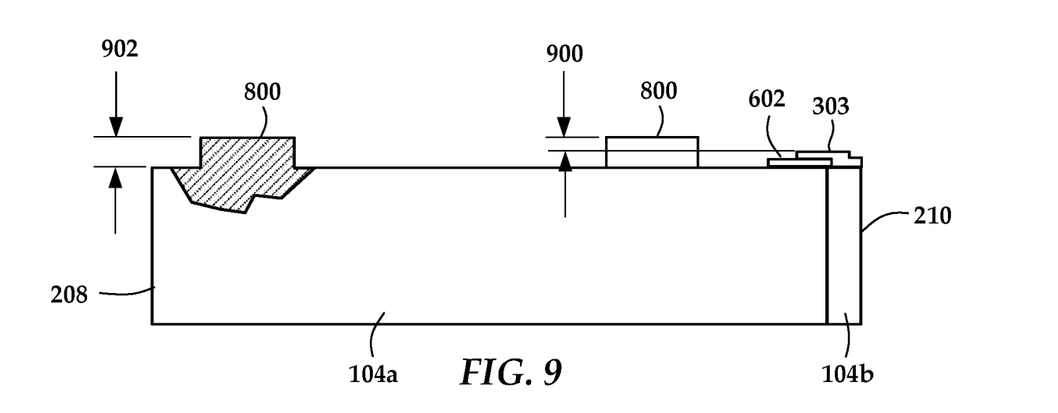
Figure 10A:
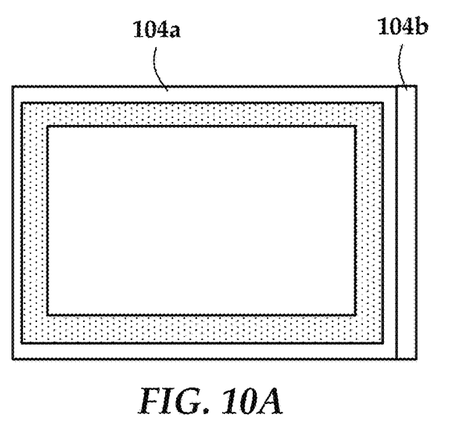
FIGS. 10A, 10B, 10C and 10D is a diagram showing various alternate mounting support geometries according to example embodiments.
Figure 10B:
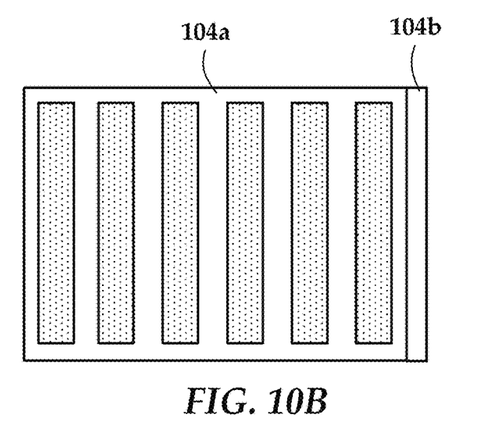
Figure 10C:
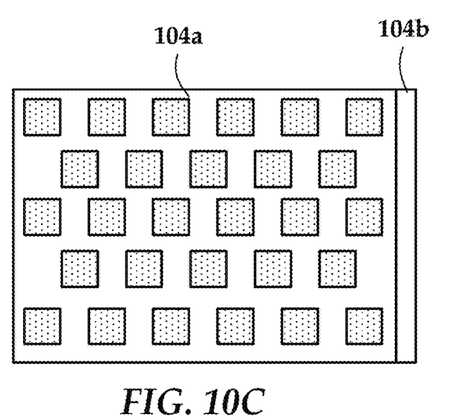
Figure 10D:
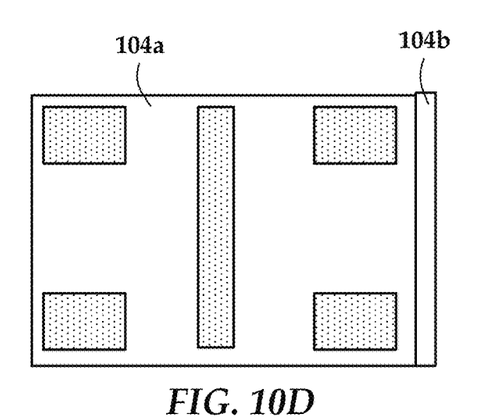

In FIGS. 8 and 9, top and side views of a slider 104 show a slider standoff arrangement according to another example embodiment. As before, the head is formed of a metallic slider body 104a and a transducer portion 104b. One or more mounting supports 800 are formed on the top surface 206 of the slider body 104a. As indicated by the cross-section in FIG. 9 corresponding to cross-section line 804, the slider body 104a and mounting supports 800 can be made of the same material, e.g., AlTiC. The mounting supports 800 can be formed etching into the slider body 104a, e.g., by depositing and patterning an etch-resistant mask that defines the shape of the mounting supports 800 and creates the top surface 206. This results in the mounting supports 800 and slider body 104a being a monolithic structure, e.g., formed or composed of a single block of homogenous material without joints or seams.

To meet an example targeted x µm mounting support offset height 900, y µm of the metal slider body is targeted for removal, wherein y=x*a/b and a/b is the relative mill rate of the metal of the slider body 104a to the oxide used in the transducer portion 104b. For example where AlTiC and alumina are used for the respective slider body 104a and transducer portion 104b, the alumina to AlTiC mill rate is 1.59/1. Thus for a target gap of 16 µm, y=16*1/1.59≈10 µm of AlTiC is etched away to form the mounting supports 800. In such an example, a 30 µm resist process enables a single mill run with 10 µm AlTiC/16 µm alumina depth. After milling, the insulator layer 602 and bonding pads 303 are deposited. This can be done using bi-layer photolithography process with 9 µm resist, which enables depositing an 8 µm metal layer. As with the embodiment shown in FIGS. 6 and 7, the height 902 of the mounting supports 800 above the top surface (which corresponds to the etch depth) may be increased in order to account for thickness of the bond pads 303 and insulator layer 602.

The specific mounting support shapes and layouts shown in FIGS. 6 and 8 can be made using either described process. Other materials can be used instead of or in addition to the described materials. For example, using a deposition process as described for FIGS. 6 and 7, the mounting support can be made from other materials, such as Al, Ti, Ag, Au, $Ta_2O_5$, and $SnO_2$. Also, other shapes and arrangements may be used. For example, in FIG. 10, a number of mounting support shapes (shaded regions) may be used, each shown on commonly referenced slider body 104a and transducer portion 104b. These shapes may be made using either of the fabrication methods described above.

Figure 11:
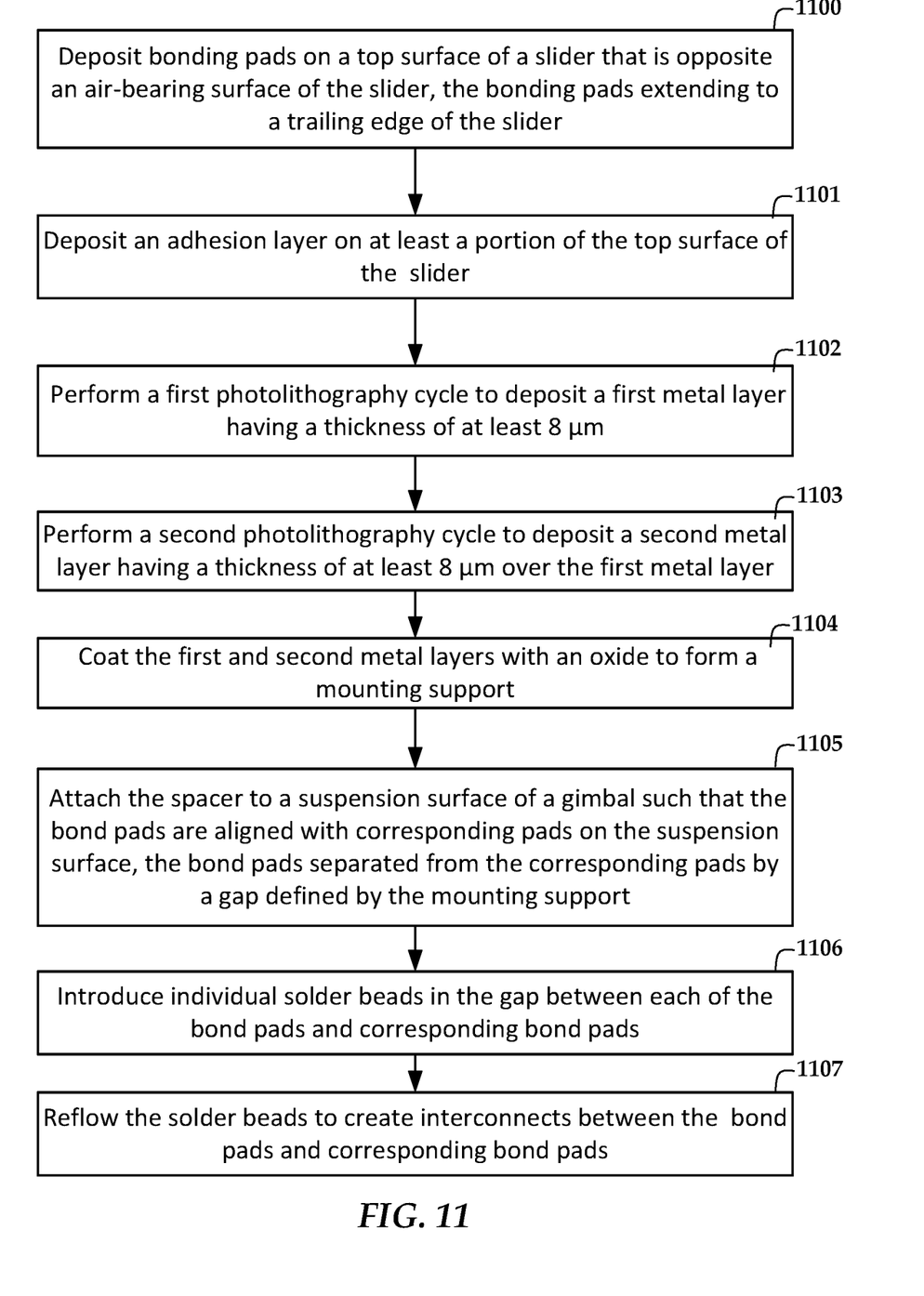
FIGS. 11 and 12 are flowcharts of methods according to example embodiments.

In FIG. 11, a flowchart shows a method according to an example embodiment. The method involves depositing 1100 bonding pads on a top surface of a slider that is opposite an air-bearing surface of the slider. The bonding pads extend to a trailing edge of the slider. An adhesion layer is deposited 1101 on at least a portion of the top surface of the slider. A first photolithography cycle is performed 1102 to deposit a first metal layer having a thickness of at least 8 µm. A second photolithography cycle is performed 1103 to deposit a second metal layer having a thickness of at least 8 µm over the first metal layer. The first and second metal layers are coated 1104 with an oxide to form a mounting support that includes at least the first and second metal layers.

The method optionally involves attaching 1105 the mounting support to a suspension surface of a gimbal such that the bond pads are aligned with corresponding pads on the suspension surface. The bond pads are separated from the corresponding pads by a gap defined by the mounting support. Individual solder beads are introduced 1106 in the gap between each of the bond pads and corresponding bond pads. The solder beads are reflowed 1107 to create interconnects between the bond pads and corresponding bond pads.

Figure 12:
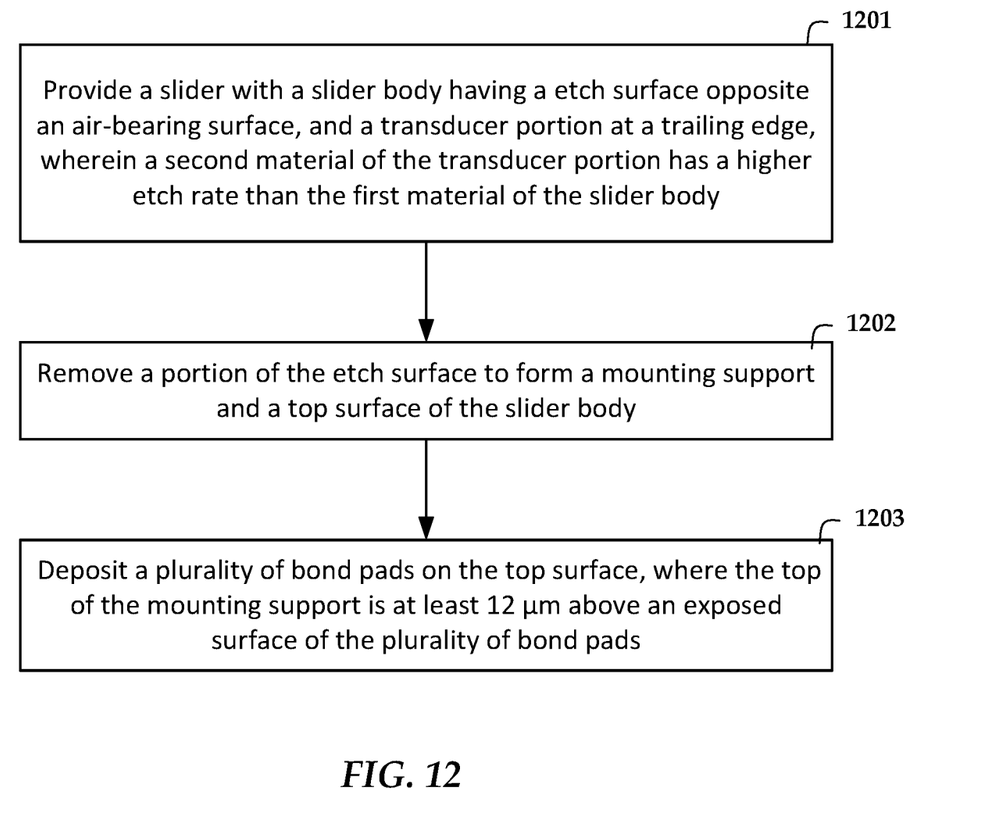

In FIG. 12, a flowchart shows a method according to another example embodiment. The method involves providing 1200 a slider body comprising a first material. The slider body has an etching surface opposite an air-bearing surface and a transducer portion comprising a second material formed at a trailing edge of the slider. The second material has a higher etch rate than the first material. A portion of the etch surface is removed 1202 (e.g., etched) to form at least one mounting support and a top surface. A plurality of bond pads is deposited 1203 on the top surface, where a top of the at least one mounting support is at least 12 µm above an exposed surface of the plurality of bond pads.

Note that after deposition 1203 of the bond pads, the method of shown in FIG. 12 may include steps 1105-1107 in FIG. 11, which involve attaching the slider bond pads to the trace bond pads. Other methods steps described elsewhere may also be performed, e.g., adding an oxide passivation layer over the mounting supports after etching 1202 the top surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A slider configured for attachment to a trace gimbal assembly, comprising:
   a slider body comprising an air-bearing surface and a top surface opposing the air-bearing surface;
   a plurality of slider bond pads disposed on or parallel to the top surface and proximate to or at a trailing edge of the slider, the plurality of slider bond pads having an exposed surface facing away from the top surface of the slider body, the plurality of slider bond pads being configured to align with trace bond pads of the trace gimbal assembly; and
   one or more mounting supports that extend from the top surface to a distance of at least 12 µm above the exposed surface of the plurality of slider bond pads such that the plurality of slider bond pads are separated from the trace bond pads by the distance when the one or more mounting supports are attached to the trace gimbal assembly.

2. The slider of claim 1, wherein the one or more mounting supports comprises a single contiguous structure that covers a majority of the top surface.

3. The slider of claim 2, wherein the slider body comprises a first metal, and the one or more mounting supports comprises an adhesion layer on the slider body with a second metal on the adhesion layer, the second metal different than the first metal.

4. The slider of claim 1, wherein the one or more mounting supports comprise two or more mounting supports located proximate to edges of the slider body.

5. The slider of claim 1, wherein the slider body comprises a first metal, and the one or more mounting supports comprises an adhesion layer on the slider body with a second metal on the adhesion layer, the second metal different than the first metal.

6. The slider of claim 5, wherein the first metal comprises AlTiC, the second metal comprises Sn, and the adhesion layer comprises Ti and Ni.

7. The slider of claim 1, wherein the slider comprises a metal oxide transducer portion at a trailing edge portion.

8. The slider of claim 7 wherein the top surface and the metal oxide transducer portion are etched leaving the one or more mounting supports extending above the top surface to the distance of at least 12 µm.

9. The slider of claim 1, wherein the separation between the plurality of slider bond pads from the trace bond pads when the mounting supports are attached to the trace gimbal assembly facilitates filling gaps therebetween with solder that electrically couples the plurality of slider bond pads to the trace bond pads.

10. A slider, comprising:
    a slider body comprising an air-bearing surface and a top surface opposing the air-bearing surface;
    a plurality of slider bond pads disposed on or parallel to the top surface and proximate to or at a trailing edge of the slider, the plurality of slider bond pads having an exposed surface facing away from the top surface of the slider body; and
    one or more mounting supports that extend from the top surface to a distance of at least 12 µm above the exposed surface of the plurality of slider bond pads, wherein the slider body and the one or more mounting supports are a monolithic structure.

11. The slider of claim 10, wherein the one or more mounting supports are formed integrally with the slider body by one of deposition on the top surface or removal of materials from the top surface.

12. The slider of claim 10, wherein the one or more mounting supports comprise a single contiguous structure that covers a majority of the top surface.

13. The slider of claim 10, wherein the one or more mounting supports comprise two or more mounting supports located proximate to edges of the slider body.

14. An apparatus, comprising:
    a trace-gimbal assembly comprising a suspension surface and a plurality of trace bond pads, the trace bond pads electrically coupled to traces of a flex circuit that deliver signals to and from signal processing circuitry of the apparatus;

a slider comprising:
- a slider body comprising an air-bearing surface, and a top surface opposing the air-bearing surface;
- a plurality of slider bond pads disposed on or parallel to the top surface and proximate to or at a trailing edge of the slider, the plurality of slider bond pads having an exposed surface facing away from the top surface of the slider body; and
- one or more mounting supports that extend from the top surface to a distance of at least 12 μm above the exposed surface of the plurality of slider bond pads;

wherein the one or more mounting supports are attached to the suspension surface of the trace-gimbal assembly such that slider bond pads and the trace bond pads are parallel to one another and separated by gaps of the distance of at least 12 μm, the gaps being filled with solder that electrically couples the trace bond pads to the slider bond pads.

15. The apparatus of claim 14 wherein the one or more mounting supports comprises a single contiguous structure that covers a majority of the top surface.

16. The apparatus of claim 14 wherein the one or more mounting supports comprise two or more mounting supports located proximate to edges of the slider body.

17. The apparatus of claim 14, wherein the slider body comprises a first metal, and the one or more mounting supports comprises an adhesion layer on the slider body with a second metal on the adhesion layer, the second metal different than the first metal.

18. The apparatus of claim 17, wherein the first metal comprises AlTiC, the second metal comprises Sn, and the adhesion layer comprises Ti and Ni.

19. The apparatus of claim 14, wherein the slider body and the one or more mounting supports are a monolithic structure.

20. The apparatus of claim 14, wherein the slider comprises a metal oxide transducer portion at the trailing edge of the slider.

* * * * *